United States Patent [19]

Ross

[11] Patent Number: 4,467,395
[45] Date of Patent: Aug. 21, 1984

[54] AC METALLIZED CAPACITOR AND IMPREGNANT THEREFOR

[75] Inventor: Sidney D. Ross, Williamstown, Mass.

[73] Assignee: Sprague Electric Company, North Adams, Mass.

[21] Appl. No.: 469,553

[22] Filed: Feb. 25, 1983

[51] Int. Cl.³ .............................................. H01B 3/20
[52] U.S. Cl. .................................... 361/315; 252/575; 252/579; 361/318; 361/319; 361/323; 361/327; 564/252
[58] Field of Search ................ 252/575, 579; 361/315, 361/318, 319, 323, 327; 564/252

[56] References Cited

U.S. PATENT DOCUMENTS

| | | | |
|---|---|---|---|
| 2,656,383 | 10/1953 | Schmidt et al. | 564/252 |
| 3,129,245 | 4/1964 | Forman et al. | 564/252 |
| 3,346,496 | 10/1967 | Neumann et al. | 252/50 |
| 3,499,838 | 3/1970 | Braid | 252/32.7 E |
| 3,740,625 | 6/1973 | Ross et al. | 361/315 |
| 4,259,708 | 3/1981 | Mandelcorn | 361/315 |
| 4,317,159 | 2/1982 | Dequasie | 361/318 |

OTHER PUBLICATIONS

E. L. Arrington, "Increasing Useful Life of Polyurethanes" IBM Technical Disclosure Bulletin 16:3223, (Mar. 1974).

Stabaxol ® P Product Information sheet, Mobay Chemical Corp.

*Primary Examiner*—John E. Kittle
*Assistant Examiner*—Robert A. Wax

[57] ABSTRACT

An AC metallized film capacitor having a plurality of electrodes separated by a dielectric spacer contains as its impregnant system an ester dielectric fluid and 2 to 10% of a N,N-substituted carbodiimide to improve capacitance retention characteristics.

7 Claims, 1 Drawing Figure

U.S. Patent  Aug. 21, 1984  4,467,395
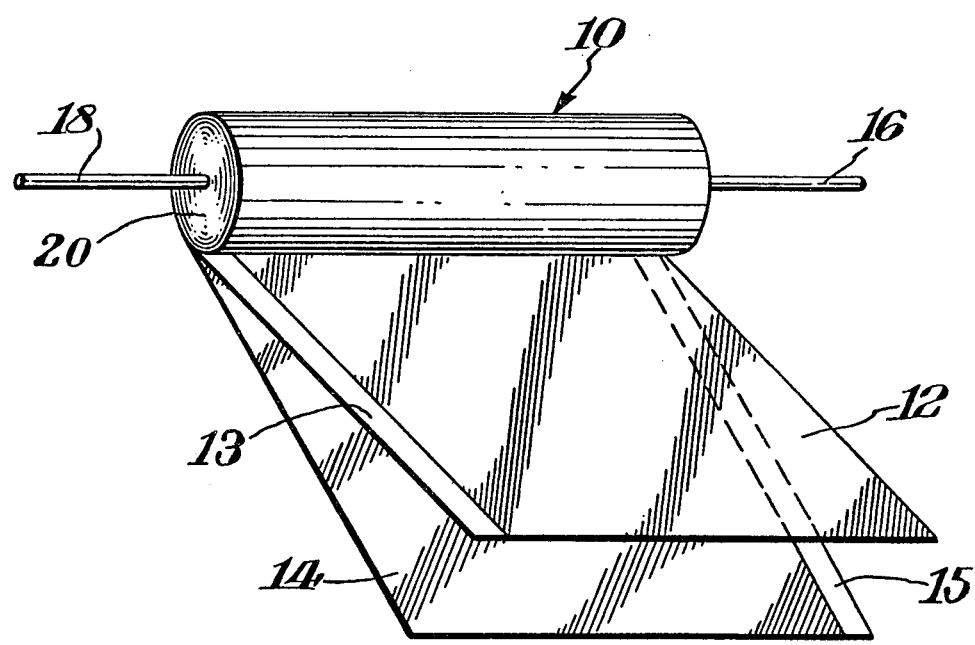

AC METALLIZED CAPACITOR AND IMPREGNANT THEREFOR

BACKGROUND OF THE INVENTION

This invention relates to an AC metallized film capacitor containing an ester dielectric fluid and 2 to 10% of a N,N-substituted carbodiimide to improve the capacitance retention characteristics of the capacitor.

Frequently, ester-based dielectric fluids used in AC metallized film capacitors are stabilized, e.g. against hydrolysis, by epoxides. Even when these fluids are stabilized, the capacitors impregnated with them show a capacitance loss on life testing. This loss may be caused by corona, traces of water or acids, or incomplete impregnation of wound sections.

SUMMARY OF THE INVENTION

It is an object of this invention to provide an AC capacitors utilizing an ester dielectric fluid with improved capacitance retention characteristics by using a N,N-substituted carbodiimide additive in the dielectric fluid.

The actual mechanism by which the carbodiimide additive functions is not known. Polymeric carbodiimides have been used to stabilize polyurethane material against hydrolysis in hot, humid environments. If the N,N-substituted carbodiimide does scavenge water, the product is the corresponding urea instead of carbon dioxide gas and amine obtained with isocyanate additives.

When the preferred carbodiimide, dicyclohexyl carbodiimide, is used, the hydrolysis product is dicyclohexyl urea which is a stable solid which has no adverse effect on capacitor operation.

Other N,N-substituted carbodiimides, such as diethylcarbodiimide, dipropylcarbodiimide, and diphenylcarbodiimide, may be used providing they and any product formed are inert with respect to capacitor materials and non-deleterious to capacitor function. The dialkyl carbodiimides are preferable, and the dicyclohexyl carbodiimide is preferred. Concentration of the additive should be 2 to 10%.

BRIEF DESCRIPTION OF THE DRAWING

The sole FIGURE depicts a partly unwound capacitor section in which the improved dielectric composition of the present invention is used as the impregnant.

DESCRIPTION OF THE PREFERRED EMBODIMENT

Capacitance retention characteristics of AC metallized film capacitors are improved by adding a N,N-substituted diimide to an ester-based dielectric fluid such as 2-ethylhexylphthalate or diisononylphthalate. A metallized film section 10, as shown partially unrolled in the FIGURE, has two metallized film electrodes 12 and 14, e.g., aluminized polypropylene, which are provided with unmetallized margins 13 and 15, respectively, oppositely positioned so that the metallized portion of each electrode is available for lead contact at only one edge of the winding. The ends of the wound section 10 are covered with metallic spray or solder 20, and tabs or leads 16 and 18 are connected thereby to electrodes 12 and 14, respectively. Section 10 is impregnated with the dielectric composition of the present invention, preferably by vacuum impregnation methods known to the capacitor art.

Capacitors containing 5 wt% of the preferred carbodiimide were subject to life testing at 500 V, 60 Hz, and 80° C. for a total of 8093 hours along with capacitors containing no additive to the dielectric fluid. In both cases, the fluid was the same, diisononylphthalate. Average initial capacitance values were 9.961 $\mu F$ for the control and 9.977 $\mu F$ for those containing the additive.

There was little change in capacitance, percent power factor, or equivalent series resistance for the first 1000 hrs in either group. However, by 2000 hrs the control group had lost approximately 4.6% capacitance while the additive group had lost only 1.24%. Percent power factor remained the same in both groups (0.01%) and equivalent series resistance has increased by less than 1 ohm in both groups. The latter two values changed relatively little over the duration of the test as percent power factor rose to 0.04% in both groups by the end of the test and ESR increased by at most 8 ohms for the control group and about 3 ohms for the additive group.

Capacitance change was dramatic, however. The control group kept increasing in capacitance loss every 1000 hrs of life test to a final value at the 8093 hours of 16.2% loss. Meanwhile, the capacitance loss by the additive group was at most 1.6%, or one-tenth of that of the control group.

Thus, capacitance loss was reduced and therefore life improved by the use of the carbodiimide additive without adverse effect on other electrical properties.

The preferred concentration range is 2 to 10% as too much of the additive degrades electrical properties (and is also expensive) and too little does not give long enough protection. The 5% level is a good compromise providing sufficient protection without degrading properties.

This invention pertains to metallized film capacitors in which the metallization is aluminum as it is fairly well established that traces of moisture will cause electrochemical erosion of the electrode under AC voltage when the metallization is aluminum. Moisture does not seem to be any problem when the metallization is zinc. Although the preferred film material is polypropylene, other aliphatic olefin polymer materials may be used, e.g. ultra-high molecular weight polyethylene, polypropylene-polybutene blends, etc.

What is claimed is:

1. An AC metallized film capacitor comprising a contiguously wound metallized film capacitor section impregnated with an ester dielectric fluid containing 2 to 10% of an N,N-substituted carbodiimide as additive to improve AC life by enhancing capacitance retention under AC conditions.

2. A capacitor according to claim 1 wherein said carbodiimide is a dialkyl carbodiimide.

3. A capacitor according to claim 2 wherein said carbodiimide is dicyclohexyl carbodiimide.

4. A capacitor according to claim 3 wherein 5% of said carbodiimide is present.

5. A capacitor according to claim 1 wherein the metallization of said metallized film is aluminum.

6. A capacitor according to claim 5 wherein said film is a polypropylene film.

7. A capacitor according to claim 1 wherein said section includes two contiguously wound metallized films.

* * * * *